(No Model.)

G. W. FULLER.
MOP HOLDER.

No. 350,240. Patented Oct. 5, 1886.

WITNESSES:
Ht Beyer
C. Sedgwick

INVENTOR:
G. W. Fuller
BY Munn & Co
ATTORNEYS.

UNITED STATES PATENT OFFICE.

GEORGE W. FULLER, OF WESTMORELAND, NEW YORK.

MOP-HOLDER.

SPECIFICATION forming part of Letters Patent No. 350,240, dated October 5, 1886.

Application filed February 15, 1886. Serial No. 191,952. (No model.)

*To all whom it may concern:*

Be it known that I, GEORGE W. FULLER, of Westmoreland, in the county of Oneida and State of New York, have invented certain new and useful Improvements in Mop-Holders, of which the following is a full, clear, and exact description.

This invention relates to mop-holders having an adjustable bail controlled by the tension of a spring to regulate the pressure of the bail on the mop in case of sudden resistance.

The invention consists in certain novel constructions and combinations of parts, including an eccentric spring-lever for opening and closing the bail away from and toward the cross-head of the holder and for securing the bail subject to tension, substantially as hereinafter described, and pointed out in the claim.

Reference is to be had to the accompanying drawings, forming part of this specification, in which similar letters of reference indicate corresponding parts in both the figures.

Figure 1:
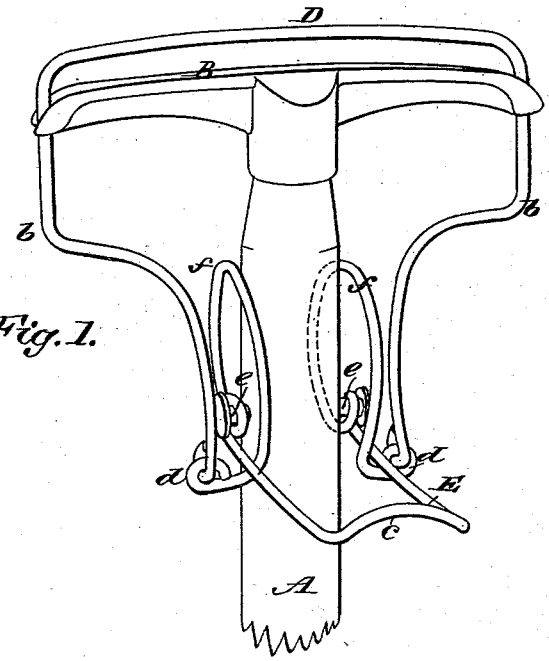
Figure 2:
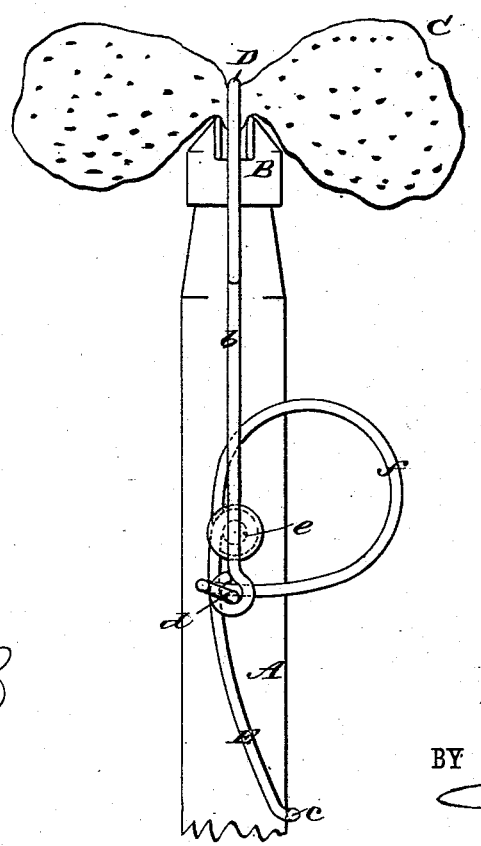

Figure 1 represents a view in perspective of the lower or forward portion of a mop-holder embodying my invention, and representing the bail as partly open relatively to the cross-head of the holder; and Fig. 2, a side view of the same with the bail closed and holding the mop in position in or on the holder.

A indicates the handle of the mop-holder; B, the usual grooved cross-head secured on the lower end of the handle; and D, the movable bail adjustable toward or from the grooved face of said cross-head, to provide for the insertion and retention of the mop C between it and the cross-head, said bail being supported by and working by its side arms or extensions, *b b*, through end extensions of the longitudinal groove in the face of the cross-head, as usual.

E is the lever for operating the bail D—that is, for opening and closing it relatively to the cross-head. This lever is made of stout spring-wire freely coiled around side trunnions, *e e*, on the handle and straddling the handle, as at *c*, at a point above the trunnions, while its forward portion, from where its coiled wrap of the trunnions terminates, is bent to form opposite side springs or loops, *f f*, which are eccentric to the trunnions. These eccentric springs *f f* freely engage at their outer bent ends, *d d*, with eyes or loops on the upper or rear ends of the side arms of the bail, which are bent inward, as usual. The terminal bent portions *d d* of said eccentric springs *f f* are so extended and the whole eccentric spring-lever E is so constructed and adjusted relatively to the bail that when the upper or rear portion, *c*, of the lever is closed down upon the handle A, to shut the bail and hold the mop C in place, as shown in Fig. 2, the centers of engagement of the outer ends, *d d*, of the eccentric springs *f f* with the side arms of the bail are in line with the centers of the trunnions *e e*, or thereabout, or, preferably, a little below or to one side thereof—that is, beyond the culminating point. This locks the bail D, when closed, without the use of a separate catch or lever to hold the operating one, E, in place, but does not restrict the elastic grip of the bail on the mop to provide for sudden resistance, inasmuch as the bail is connected with the free ends of the springs *f f*. By said springs, too, being in or part of the operating-lever, not only is the use of separate springs avoided, but any spring action in the bail itself is unnecessary, so that the bail may be of a solid or strong construction.

To open the mop-head, either for entry or release of the mop, the upper or rear end of the operating-lever E is lifted or thrown over toward the front of the mop-head, as shown, or partially so, at least, in Fig. 1.

The peculiar novelty of the invention or feature wherein it differs from other mop-holders having an adjustable bail controlled by the tension of a spring, and more particularly from that description of such mop-holders in which the spring is independent of the bail and rocks or throws over forwardly or backwardly upon the handle, to open or close the head of the mop-holder, is in the lever E working upon pivots on opposite sides of the handle and constructed to form eccentric springs *f f* upon both sides of the handle, for operation as hereinbefore described. By the construction and operation of this double spring-lever in connection with the bail and handle, as described, not only is great strength obtained for the spring-lever, but it exerts a direct lever-pull upon the bail without straining on the springs until near the close of shutting down the lever on the handle, when it forms a positive lock, as specified.

Having thus described my invention, what I claim as new, and desire to secure by Letters Patent, is—

In a mop-holder, the combination, with the handle A, having side trunnions, *e e*, and with the adjustable bail D, of the eccentric spring-lever E, constructed, substantially as shown and described, of or from a piece of spring-wire coiled around the trunnions and engaging with the bail for operation in relation with the bail and handle, substantially as specified.

GEORGE W. FULLER.

Witnesses:
A. GREGORY,
C. SEDGWICK.